Dec. 24, 1963            T. O. RENNER            3,115,206
SUSPENDED INTEGRAL DRIVE AND REAR AXLE ASSEMBLY FOR AUTOMOBILES
Filed Feb. 23, 1962            2 Sheets-Sheet 1
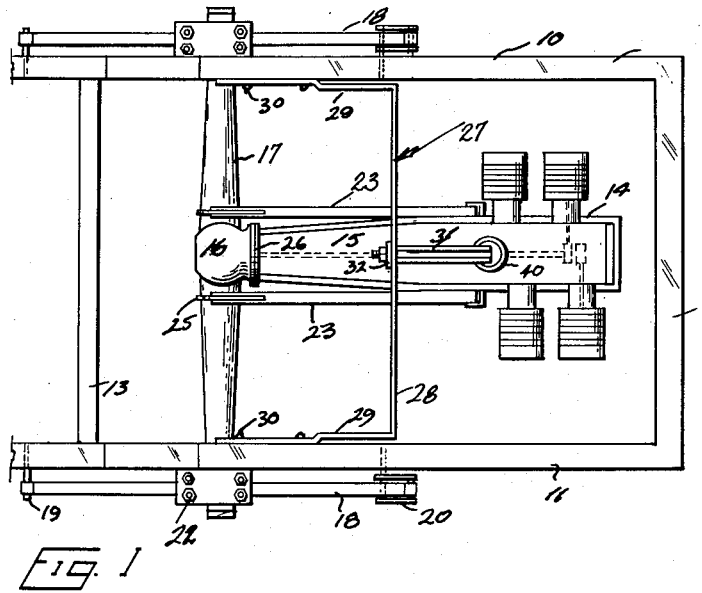
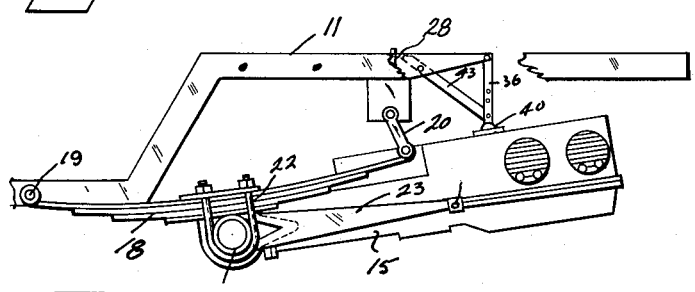
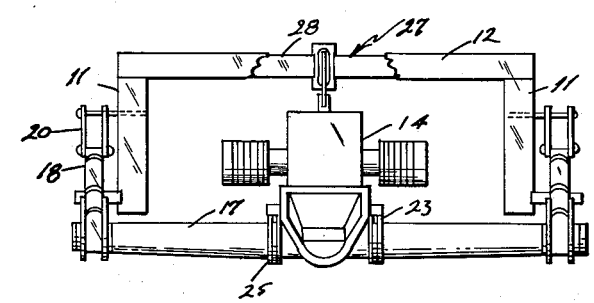
INVENTOR
THOMAS OTTO RENNER
HIS ATTYS

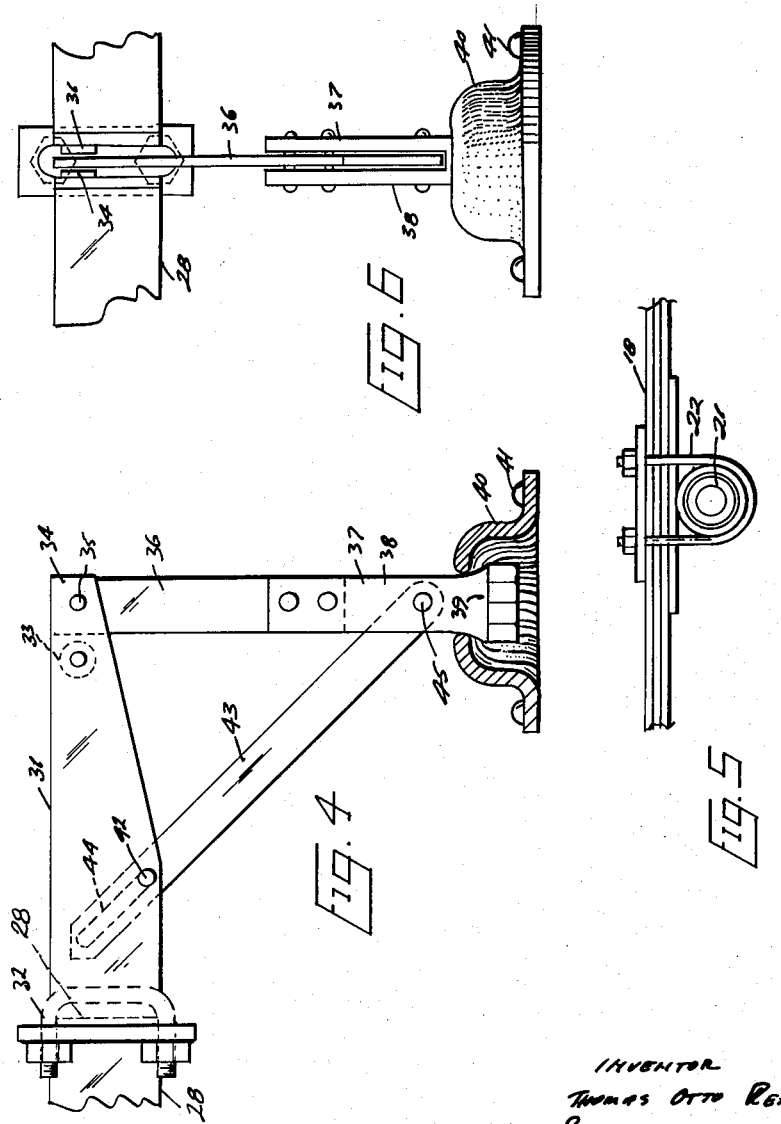

United States Patent Office 3,115,206
Patented Dec. 24, 1963

3,115,206
SUSPENDED INTEGRAL DRIVE AND REAR AXLE
ASSEMBLY FOR AUTOMOBILES
Thomas Otto Renner, Priddis, Alberta, Canada
Filed Feb. 23, 1962, Ser. No. 175,148
2 Claims. (Cl. 180—73)

My invention relates to new and useful improvements in suspended engine and drive means for automobiles.

With the current popularity of rear mounted engines for automobiles, considerable efforts have been made to provide an efficient, yet simple integral engine and transmission unit connectable to the rear axle of the automobile.

The majority of such devices are extremely involved and include considerable linkage between the engine and the rear axle and the difficulties of power transmission are aggravated by the considerable vertical movement of the rear axle particularly when travelling over relatively rough surfaces.

I have overcome these difficulties by providing an integral engine, transmission and rear axle unit pivotally suspended by means of a torque reaction assembly from the chassis rearwardly of the rear axle, said rear axle being bearably supported by the conventional leaf springs which are situated one upon each side of the automobile chassis.

Although the device is not limited thereto, nevertheless it is particularly suitable for use with multiple horizontally opposed engines conventionally known as "Pancake" engines.

The principal object and essence of my invention is therefore to provide an integral source of power, transmission, and rear axle suspended by a torque reaction assembly to the car chassis.

Another object of my invention is to provide a device of the character herewithin described in which the torque reaction assembly includes means to limit the downward movement of the engine.

Another object of my invention is to provide a device of the character herewithin described which is so designed that the forward thrust of the engine transfers a percentage of the weight to the rear axle giving additional traction.

Yet another object of my invention is to provide a device of the character herewithin described which, due to its design, limits the vertical movement of the engine itself to an amount which is tolerable and which does not throw additional strain on the engine.

A yet further object of my invention is to provide a device of the character herewithin described which is simple in construction, economical in manufacture, and otherwise well suited to the purpose for which it is designed.

With the foregoing objects in view, and such other objects and advantages as will become apparent to those skilled in the art to which this invention relates as this specification proceeds, my invention consists essentially in the arrangement and construction of parts all as hereinafter more particularly described, reference being had to the accompanying drawings in which:

FIGURE 1 is a top plan view of the rear portion of an automobile chassis with my device situated therein.

FIGURE 2 is a side elevation of FIGURE 1.

FIGURE 3 is a rear elevation of FIGURE 1.

FIGURE 4 is an enlarged fragmentary side elevation showing the attachment of the torque bar to the engine.

FIGURE 5 is an enlarged fragmentary side elevation showing the mounting of the rear axle housing to the leaf springs.

FIGURE 6 is a rear elevation of FIGURE 4.

In the drawings like characters of reference indicate corresponding parts in the different figures.

Proceeding therefore to describe my invention in detail, reference to the accompanying drawings will show the rear portion 10 of an automobile chassis including the longitudinal side frame members 11 and the transverse rear member 12 with cross brace 13 forwardly of the rear axle assembly.

A horizontally opposed transverse pancake engine 14 forms the source of power in this unit and a conventional transmission unit 15 is secured to the source of power 14 and extends forwardly therefrom. This in turn is connected to a differential unit 16 situated upon the upper side of an axle housing 17, so that the axle housing, the differential, the transmission and the source of power form one integral unit.

A pair of leaf springs 18 are situated one upon each side of the chassis and are pivotally secured by the forward end thereof by means of pivot 19 and are connected by means of swinging links 20, to the side frame members but rearwardly of the rear axle 17. The mounting of these leaf springs is conventional and the forward thrust of the source of power is transmitted via the springs to the forward pivot 19 in the usual manner.

Secured medially along the length of the leaf springs 18 is the axle housing 17, said axle housing including bearings 21, securement being by means of U-bolts 22 in the conventional manner and as clearly shown in FIGURE 5.

Further securement of the engine and transmission to the rear axle is occasioned by U-shaped torque bars 23 secured one upon each side of the engine housing by means of bolts 24. These torque bars extend parallel to the engine housing and engage around the axle housing 17 by means of U-shaped straps 25 thus preventing strain occurring at the junction 26 between the transmission housing and the differential housing 16.

The engine is suspended from the chassis by means of a torque reaction assembly collectively designated 27. This torque reaction assembly includes a transversely situated torque bar 28 spanning the side members 11 of the chassis and having forwardly extending arms 29 formed upon the extremities thereof whereby the torque arm may be secured to the side chassis members 11 by means of bolts 30.

Extending rearwardly medially of the torque bar 28 is a pair of spaced and parallel torque arms 31 being U-shaped at the front end thereof. A U-bolt clamp 32 extends around the junction of the arms 31 at the forward end thereof and clamps same to the torque bar 28 at the center thereof. These torque arms are substantially horizontal when viewed in side elevation and include a spacer 33 adjacent the rear end 34 thereof. Pivotally secured between these rear ends, by means of pin 35, is a suspension plate 36 extending vertically downwardly therefrom, said suspension plate being secured within the fork ends 37 of an engine attaching member 38. This engine attaching member 38 comprises a ball socket 39 held within a ball socket housing 40 which in turn is secured to the upper surface of the source of power 14 by means of bolts 41 so that a ball and socket junction is formed at this point.

Means are provided to limit the downward movement of the torque arms 31 comprising a torque stop pin spanning said torque arms as shown at 42. A torque stop plate 43 is slotted at the upper end thereof as at 44, said slot engaging said pin 42 between the torque arms 31. The lower end of the torque stop plate is pivotally connected by means of pin 45, to the member 38 so that, when viewed in side elevation, the torque arms, the torque suspension plate, and the torque stop plate are triangular in configuration.

Upon the assumption that the wheel base is 108 inches upon 6.70 inches by 15 inches tires and an overhang suspension between the rear axle and the point of attachment to the source of power being 28 inches, the following figures are desirable.

The thickness and resiliency of the 3½ inches wide by approximately ¼ inch thick torsion bar 28 should be such that it will require an additional 350 pounds plus the curb weight of the unit at the point of suspension 40, to pull the slotted arm 43 the full amount of movement allowed by the pin 42.

As the car is thrust forwardly by the source of power, there will be a down pull at the point of suspension upon the source of power at 40 amounting to approximately 50 pounds for each 100 pound forward thrust.

For each 50 pounds down pull at the point of suspension there will be a 13 pound weight transfer from the front axle to the rear axle. Thus, with a 1,000 pound forward thrust there will be 130 pound weight transfer to the rear axle giving the car additional traction.

The up and down movement of the differential 16 will be approximately half the amount of the up and down movements at each wheel. Since the engine center of gravity will be approximately 6 inches beyond the 28 inch suspension overhang, the up and down movements at the center of gravity of the engine will be approximately ¼ the vertical movements at the differential 16. Thus a 2 inch movement at either wheel will amount to a 1 inch movement at the differential and ¼ inch movement at the engine. Also, the pivoting action is by a torsion bar assembly, the disturbing movements at the engine will be relatively small and will not effect the operation thereof.

It will, of course, be appreciated that movements at the rear axle and spring attaching point, at the point between the torque arms and the suspension plate, and the point of suspension of the assembly to the source of power will act as a universal action between the engine assembly and the chassis.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

What I claim as my invention is:

1. A suspended integral drive and rear axle assembly for automobiles adapted to be attached to the rear of the automobile chassis, said chassis including a pair of longitudinal spaced and parallel side frame members; said assembly comprising in combination a source of power, a transmission unit secured to said source of power, a transverse rear axle and differential unit secured to said transmission unit, said source of power being operatively connected to said rear axle and differential unit, a pair of leaf springs pivotally secured one upon each side, to said side frame members, said rear axle and differential unit being bearably secured transversely to said springs and approximately medially of the length thereof, and a torque reaction assembly spanning said side frame members and being secured to said source of power medially along the length of said torque reaction assembly, said torque reaction assembly including a transverse torque bar spanning said side frame members rearwardly of said rear axle and differential unit and being secured by the ends thereof to said side frame members, a torque arm unit extending from medially said torque bar to said source of power, said torque arm unit comprising a pair of spaced and parallel torque arms, a suspension plate secured by the upper end thereof to the rear ends of said torque arms and by the lower end thereof pivotally to said source of power, a torque stop pin spanning said spaced and parallel torque arms, a slotted torque stop plate engaging, by one end thereof, said pin, and being secured by the other end thereof to adjacent the lower end of said suspension plate, said torque arms, said suspension plate and said torque stop plate forming a triangular configuration when viewed in side elevation.

2. The device according to claim 1 in which said torque arm unit includes means to limit the movement of said torque arm unit.

References Cited in the file of this patent

UNITED STATES PATENTS

| | | |
|---|---|---|
| 2,128,930 | Fageol et al. | Sept. 6, 1938 |
| 2,836,254 | Boehner | May 27, 1958 |

FOREIGN PATENTS

| | | |
|---|---|---|
| 219,428 | Austria | Jan. 25, 1962 |
| 453,388 | Great Britain | Sept. 10, 1936 |